United States Patent
Oshiro (10) Patent No.: US 7,609,151 B2
(45) Date of Patent: Oct. 27, 2009

(54) APPARATUS, METHOD AND PROGRAM FOR ALARMING ABNORMALITY IN TIRE AIR-PRESSURE

(75) Inventor: Yuji Oshiro, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 353 days.

(21) Appl. No.: 11/600,177

(22) Filed: Nov. 16, 2006

(65) Prior Publication Data

US 2007/0132569 A1  Jun. 14, 2007

(30) Foreign Application Priority Data

Dec. 9, 2005  (JP) ............................. 2005-356317
Oct. 5, 2006  (JP) ............................. 2006-274374

(51) Int. Cl.
*B60C 23/00* (2006.01)
*B60C 23/02* (2006.01)

(52) U.S. Cl. .................. 340/444; 340/438; 340/442; 340/445; 73/146.2

(58) Field of Classification Search ......... 340/442–448; 73/146, 146.2; 701/70
See application file for complete search history.

(56) References Cited

U.S. PATENT DOCUMENTS

| | | | |
|---|---|---|---|
| 3,691,524 A | | 9/1972 | Frost et al. |
| 3,974,477 A | * | 8/1976 | Hester ......................... 340/448 |
| 4,876,528 A | * | 10/1989 | Walker et al. ................ 340/442 |
| 5,248,957 A | * | 9/1993 | Walker et al. ................ 340/444 |
| 5,345,217 A | * | 9/1994 | Prottey ........................ 340/442 |
| 5,721,374 A | * | 2/1998 | Siekkinen et al. ........... 73/146.2 |
| 5,826,210 A | * | 10/1998 | Izumi et al. .................... 701/70 |
| 5,939,626 A | * | 8/1999 | Tominaga et al. ........... 73/146.2 |
| 6,396,396 B2 | * | 5/2002 | Oshiro et al. ................ 340/442 |
| 6,684,691 B1 | * | 2/2004 | Rosseau ....................... 73/146 |
| 6,799,129 B2 | * | 9/2004 | Schmidt et al. ............... 702/73 |
| 7,546,763 B2 | * | 6/2009 | Roos et al. ..................... 73/146 |
| 2007/0132569 A1 | * | 6/2007 | Oshiro ......................... 340/444 |

FOREIGN PATENT DOCUMENTS

| | | |
|---|---|---|
| EP | 0 636 503 A1 | 2/1995 |
| EP | 0 826 525 A2 | 3/1998 |
| EP | 0 861 743 A2 | 9/1998 |
| EP | 1 477 337 A2 | 11/2004 |
| JP | 63-305011 A | 12/1988 |
| JP | 10-100620 A | 4/1998 |
| JP | 11-180118 A | 7/1999 |
| JP | 2002-21120 A | 7/2002 |
| WO | WO-01/12453 A1 | 2/2001 |
| WO | WO-2005/051685 A1 | 6/2005 |

\* cited by examiner

*Primary Examiner*—Daniel Wu
*Assistant Examiner*—Son M Tang
(74) *Attorney, Agent, or Firm*—Birch, Stewart, Kolasch & Birch, LLP (57) ABSTRACT

The present invention provides an apparatus, method and program for alarming abnormality in tire air-pressure which detects abnormality of a tire even under unusual conditions such as offset load on a vehicle or providing a snow chain on one wheel. The apparatus, method and program for alarming abnormality in tire air-pressure include means of comparing rotational wheel velocities of respective tires provided on a vehicle and detecting whether or not rotational wheel velocity of one wheel is slower than those of other wheels by comparing rotational wheel velocities of respective tires provided on a vehicle.

3 Claims, 6 Drawing Sheets

APPARATUS, METHOD AND PROGRAM FOR ALARMING ABNORMALITY IN TIRE AIR-PRESSURE

BACKGROUND OF THE INVENTION

The present invention relates to an apparatus, method and program for alarming abnormality in tire air-pressure.

Among tires, it is difficult to determine decrease in tire air-pressure, in particular such as a run-flat tire which allows traveling even if air-pressure therein is zero. In the case where a vehicle travels at high velocity with decreased air-pressure, there has been a problem that a tire may blow out.

In view of this, various methods to detect decrease in tire air-pressure have been investigated. In Japanese Unexamined Patent Publication No. 305011/1988, it is disclosed a method for detecting a deflated tire from wheel velocities of four wheel tires provided on a vehicle by using a tire deflation warning system (DWS). According to this method, by utilizing a phenomenon in which rotational velocity becomes faster due to the decrease in substantial rotational radius when tire air-pressure is decreased, an air-pressure in a certain tire on a wheel is detected to be decreased from a difference between the sum of the wheel rotational velocity of a pair of tires on a diagonal line and the sum of the wheel rotational velocity of a pair of tires on the other diagonal line as well as a difference between rotational velocity of a certain wheel and an average value of rotational velocities of four wheels.

However, there are cases in which a rotational velocity of a certain wheel becomes slower compared with those of the other wheels not only under unusual conditions such as offset load on a vehicle or providing a snow chain on one wheel, but also under condition for cornering of a vehicle. Under such traveling conditions, in the case where air-pressure is detected by the above-mentioned method for detecting decrease in tire air-pressure, there are cases in which a deflation alarm is issued even when air-pressure decrease is not generated in fact. There has been a problem that such unnecessary alarm results in making an erroneous decision and incurring unnecessary costs (maintenance) to a driver.

An object of the present invention is to provide an apparatus, method and program for alarming abnormality in tire air-pressure which allows detecting abnormality of a tire even under unusual traveling conditions such as offset load on a vehicle or providing a snow chain on one wheel.

SUMMARY OF THE INVENTION

An aspect of the present invention relates to an apparatus for alarming abnormality in tire air-pressure, including means of comparing rotational wheel velocities of respective tires provided on a vehicle and detecting whether or not rotational wheel velocity of one wheel is slower than those of other wheels.

Another aspect of the present invention relates to a method for alarming abnormality in tire air-pressure, including steps of comparing rotational wheel velocities of respective tires provided on a vehicle and detecting whether or not rotational wheel velocity of one wheel is slower than those of other wheels.

A further aspect of the present invention relates to a program for alarming abnormality in tire air-pressure, making a computer execute a procedure of comparing rotational wheel velocities of respective tires provided on a vehicle and detecting whether or not rotational wheel velocity of one wheel is slower than those of other wheels.

According to the present invention, it is determined whether or not rotational wheel velocity of one wheel is slower compared with those of other wheels by comparing rotational wheel velocities of respective tires provided on a vehicle. Therefore, an issuance of an erroneous alarm is prevented not only under unusual traveling conditions such as offset load on a vehicle or providing a snow chain on one wheel, but also under cornering of a vehicle.

DETAILED DESCRIPTION

Embodiment

An apparatus for alarming abnormality in tire air-pressure according to one Embodiment of the present invention includes means for detecting whether or not rotational wheel velocity of one wheel is slower compared with those of the other wheels by comparing rotational wheel velocities of respective tires provided on a vehicle.

Hereinafter, the apparatus for alarming abnormality in tire air-pressure according to the present invention is explained based on the accompanying drawings.

Figure 1:
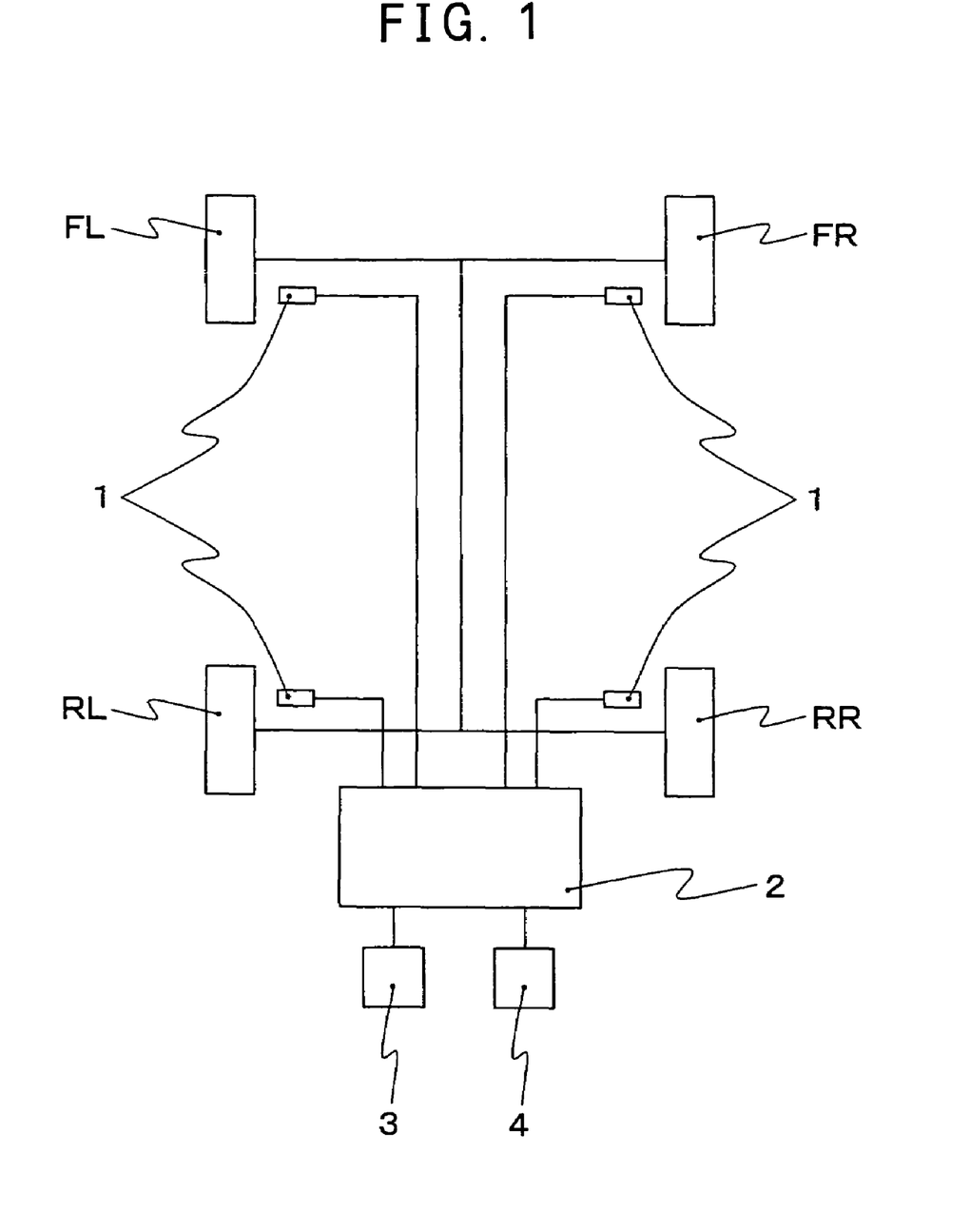
FIG. 1 is a block diagram showing one Embodiment of the apparatus for alarming abnormality in tire air-pressure according to the present invention.

FIG. 1 is a block diagram showing one Embodiment of the apparatus for alarming abnormality in tire air-pressure according to the present invention.

As shown in FIG. 1, an apparatus for alarming abnormality in tire air-pressure according to one Embodiment of the present invention detects whether or not air-pressure of any one of four tires (front left tire (FL tire), front right tire (FR tire), rear left tire (RL tire) and rear right tire (RR tire)) provided on, for example a vehicle are decreased. The apparatus for alarming abnormality in tire air-pressure includes a wheel velocity sensor 1 which is a conventional velocity detecting means provided with respect to each tire. The output of the wheel velocity sensor 1 is supplied to a control unit 2. To the control unit 2, an alarm 3 which includes such as a liquid crystal display element, plasma display element or CRT for informing a tire of which the tire air-pressure has decreased and an initialization switch 4 which may be operated by a driver are connected.

Figure 2:
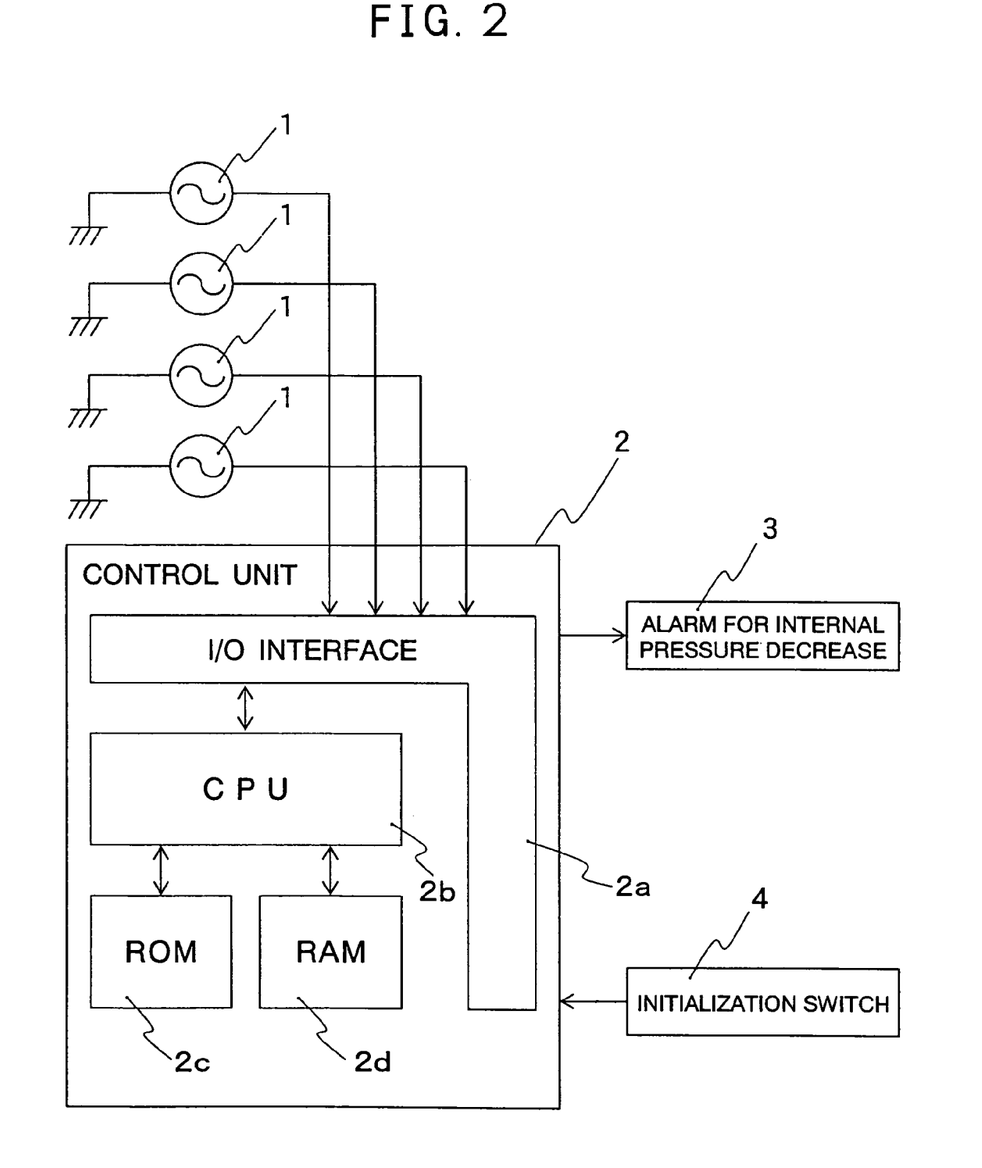
FIG. 2 is a block diagram showing an electrical configuration of the apparatus for alarming abnormality in tire air-pressure shown in FIG. 1.

The control unit 2 includes an I/O interface 2a which is required for sending/receiving a signal to/from an external device, a CPU 2b which functions as a center of processing, a ROM 2c which stores control operation programs for the CPU $2b$ and a RAM $2d$ into which data is temporarily written and from which data is read out when the CPU $2b$ performs control operations (FIG. 2).

In the wheel velocity sensor 1, a pulse signal corresponding to the number of revolution of a tire (hereinafter, referred to as wheel velocity pulse) is outputted. In the CPU $2b$, rotational angular velocity $F_i$ ($F_1$ to $F_4$) of each tire is calculated at specified sampling periods $\Delta T$ (sec), for example $\Delta T=1$ second, on the basis of the wheel velocity pulses which are outputted from the wheel velocity sensor 1. $F_1$ to $F_4$ represent the rotational angular velocities of the FL tire, FR tire, RL tire and RR tire, respectively.

Since tires are manufactured by including variations within a specification (initial difference), effective rotational radii of respective tires (value obtained through dividing a distance being advanced with one revolution by $2\pi$) are not necessarily the same even when inner pressures of all tires are normal. Therefore, the rotational angular velocities $F_i$ of respective tires thus vary. Therefore, the corrected rotational angular velocity $F1_i$ is calculated to cancel the variation due to the initial difference. Specifically, the value is corrected as follows.

$$F1_1=F_1$$

$$F1_2=mF_2$$

$$F1_3=F_3$$

$$F1_4=nF_4$$

The correction coefficients m, n are obtained by calculating the rotational angular velocity $F_i$ under the condition when a vehicle is traveling straight, for example, and by calculating $m=F_1/F_2$ and $n=F_3/F_4$ based on the calculated rotational angular velocity $F_i$.

Thereafter, the rotational wheel velocity Vi is calculated based on the $F1_i$.

The slower wheel with the slowest rotational velocity (slower wheel) among the calculated rotational wheel velocities Vi is calculated by the following determinate values on the basis of ratios.

$$DEL(1)=[(V1+V4)/(V2+V3)-1]\times 100\%$$

$$DEL(2)=[(V1+V2)/(V3+V4)-1]\times 100\%$$

$$DEL(3)=[(V1+V3)/(V2+V4)-1]\times 100\%$$

Wherein V1 to V4 respectively represent wheel velocities of the front left tire (FL tire), front right tire (FR tire), rear left tire (RL tire) and rear right tire (RR tire) in the above equation.

It should be noted that besides those determinate values on the basis of ratios, determinate values on the basis of differences as shown in the following may be used.

$$DEL(1)=[(V1+V4)-(V2+V3)]/(V1+V2+V3+V4)\times 200\%$$

$$DEL(2)=[(V1+V2)-(V3+V4)]/(V1+V2+V3+V4)\times 200\%$$

$$DEL(3)=[(V1+V3)-(V2+V4)]/(V1+V2+V3+V4)\times 200\%$$

A slower wheel is judged on the basis of signs of calculated determinate values DEL (1) to (3) as shown in Table 1.

TABLE 1

| | DEL 1_R | DEL 2_R | DEL 3_R |
|---|---|---|---|
| Slower wheel at FR | + | − | + |
| Slower wheel at FL | − | − | − |
| Slower wheel at RR | − | + | + |
| Slower wheel at RL | + | + | − |

The data which is used for detecting whether or not the rotational wheel velocity of one wheel is slower by comparing rotational wheel velocities of respective tires provided on a vehicle is stricter than the data used for alarming abnormality in air-pressure in terms of a condition for use. Therefore, it is preferable to limit the detection only at the initial stage of traveling in order to avoid influencing the determination of alarming abnormality in air-pressure. Here, the initial stage of traveling means the period until one wheel is detected to have slower rotational wheel velocity. In other words, it is the period until the data used for the detection is collected (for example, until 15 data is collected).

As for data for detecting whether or not the rotational wheel velocity of one wheel is slower than those of other wheels by comparing rotational wheel velocities of respective tires provided on a vehicle, solely the data located near straight travel is preferably used to enhance the accuracy of detection. In addition, it is preferable to detect by using solely the data whose determinate values are stable since a vehicle is likely to travel straight. The data at the time of cornering is likely to contain errors. It can be judged whether or not a vehicle is traveling straight by monitoring yaw rate and it can be judged whether or not a determinate value is stable by monitoring such as the time change of the determinate value.

The result of detection as to whether or not the rotational wheel velocity of one wheel is slower than those of other wheels by comparing rotational wheel velocities of respective tires provided on a vehicle is preferably reset when a vehicle is stopping. Since offset load or providing a snow chain on one wheel is a condition in which rotational wheel velocity of one wheel becomes slower, and this condition arises when a vehicle is stopping. It is also possible to reset the detection result only in the case where rotational wheel velocity of one wheel is slow.

In general, in the case where rotational wheel velocity of one wheel is faster, the air-pressure of the tire is likely to be decreased. On the other hand, in the case where rotational wheel velocity of one wheel is slower, the rotational wheel velocity of the certain wheel is likely to be slower compared with those of the other wheels due to an unusual traveling condition such as offset load or providing a snow chain on one wheel, or due to cornering traveling. Accordingly, with the apparatus for alarming abnormality in tire air-pressure according to the present invention, it is preferable not to carry out the judgment of decrease in tire air-pressures or it is preferable to only carry out the judgment of decrease in air-pressure with respect to a wheel located at the diagonal position of the wheel with slower rotational wheel velocity in the case where rotational wheel velocity of one wheel is slow.

As for a means of detecting decrease in tire air-pressure, known means, such as the method utilizing dynamic load average or the method utilizing the fact that the rotational wheel velocity of one wheel becomes faster, may be used.

Furthermore, one Embodiment of the present invention relates to a program for alarming abnormality in tire air-pressure which makes a computer execute the procedure of comparing rotational wheel velocities of respective tires provided on a vehicle and detecting whether or not rotational wheel velocity of one wheel is slower than those of other wheels. The Embodiment can be implemented in the same manner as the apparatus for alarming abnormality in tire air-pressure according to the present invention and will now be explained in detail by referring to flowcharts of FIGS. 3 and 4.

Figure 3:
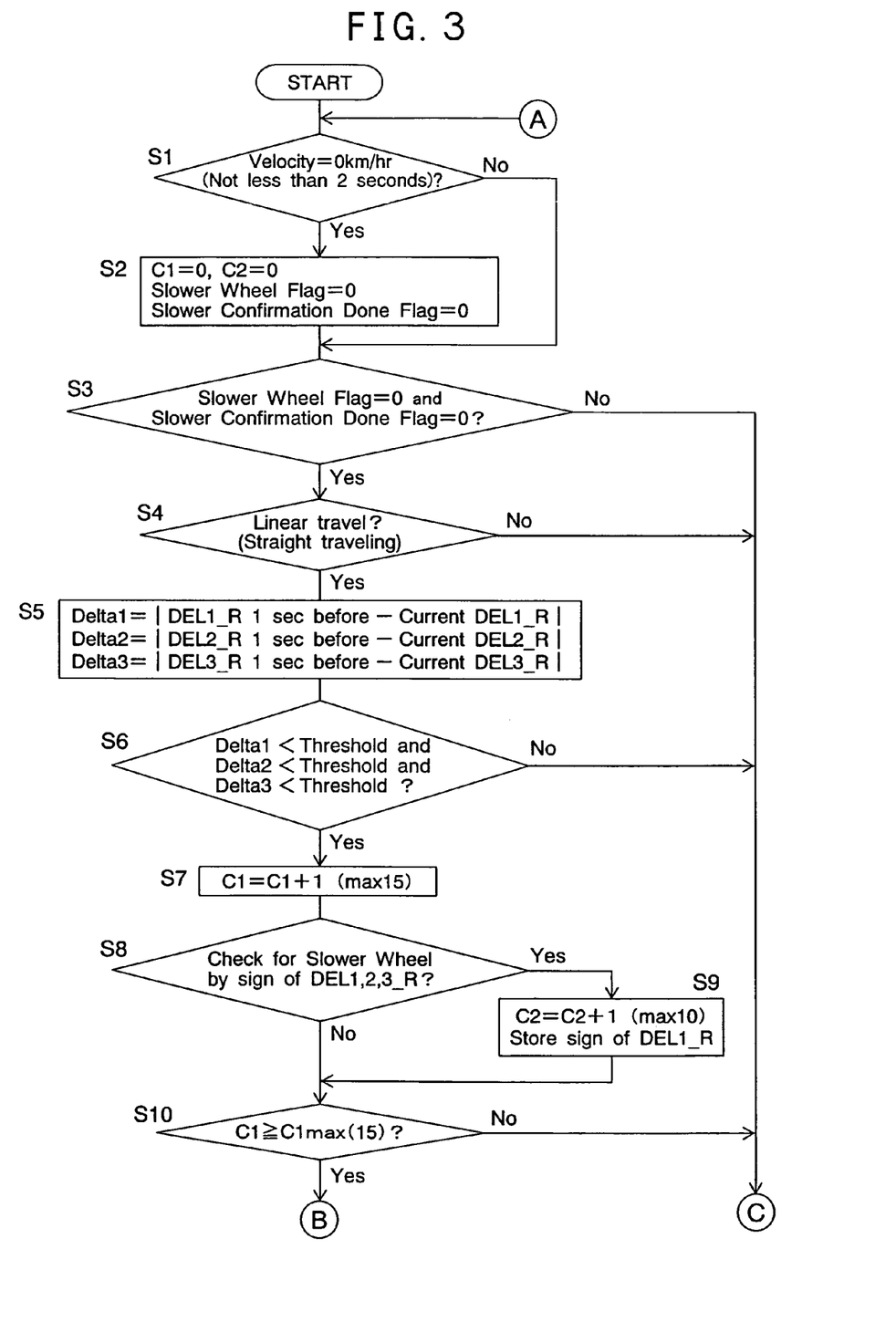
FIG. 3 is a flowchart showing a data processing program of the method for alarming abnormality in tire air-pressure according to the present invention.
Figure 4:
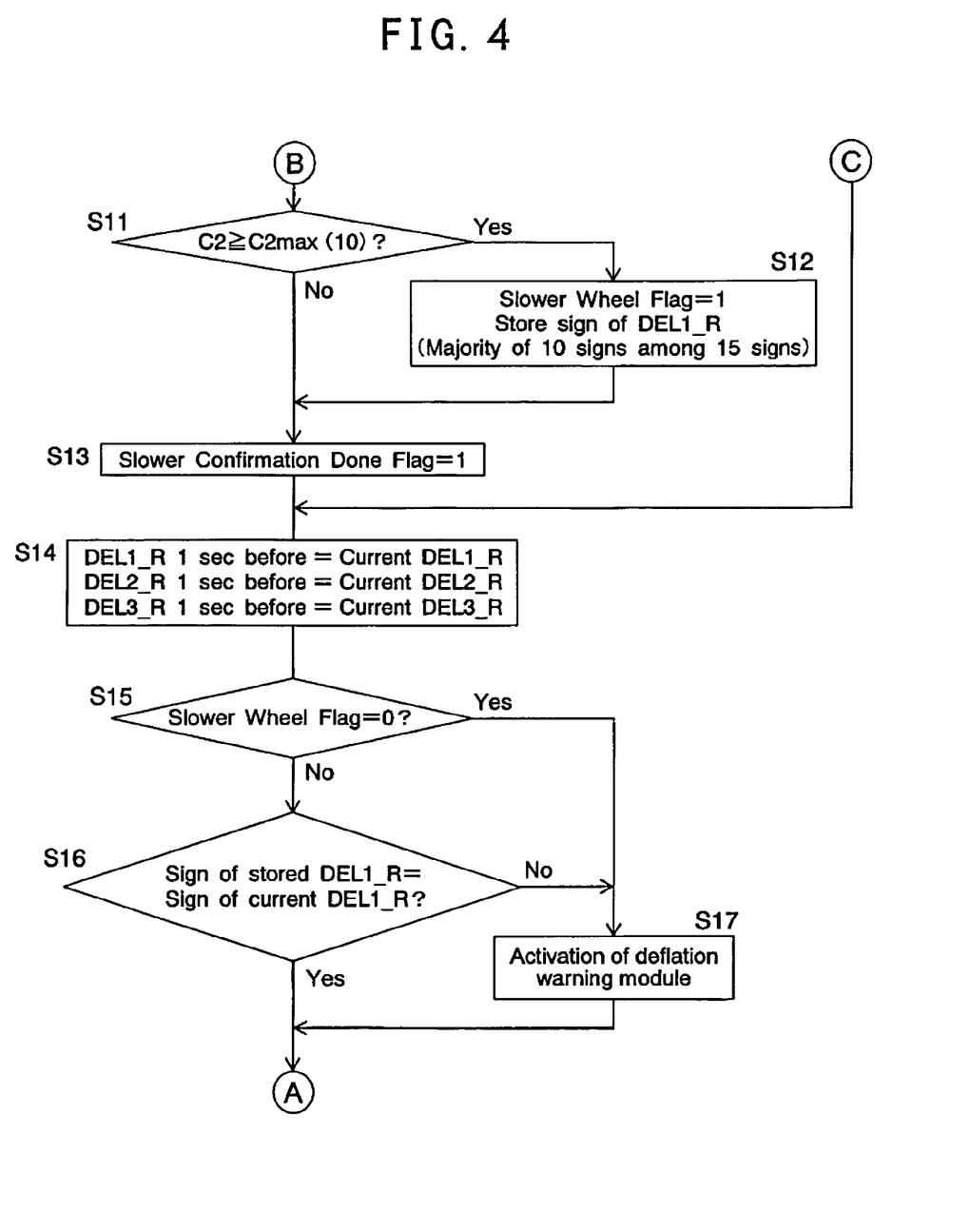
FIG. 4 is a flowchart showing a data processing program of the method for alarming abnormality in tire air-pressure according to the present invention.

Firstly, variables described in the flowcharts are explained.

Slower Confirmation Done Flag is set to 1 when the judgment whether or not rotational wheel velocity of one wheel is slower than those of other wheels. On the other hand, Slower wheel Flag is set to 1 when it is determined that rotational wheel velocity of one wheel is slower compared with those of other wheels.

C1 is a counter which increases when it is judged that a determinate value is stable during straight travel, and the counter conclusively judges whether or not one wheel is slower than those of the other tires when the counter reaches 15, for example. On the other hand, C2 is a counter which increases when it is judged that rotational wheel velocity of one wheel is slower than those of the other tires (by using solely a current determinate value). It is judged that rotational wheel velocity of one wheel is slower than those of the other tires when C2 is 10 among 15 values, for example.

In FIGS. 3 and 4, the variables are reset during stop of a vehicle (at least 2 seconds) at steps S1, S2. At step S3, it is confirmed that whether the value of detection flag of a wheel with slower rotational velocity (Slower Wheel Flag) and execution flag of the detection are 0 (Slower Confirmation Flag). In the case where the values of flags are 0, the step proceeds to the subsequent step.

At step S4, it is determined whether or not the vehicle is traveling straight (yaw rate is not more than the predetermined value). The determination of wheel velocity is made only in the case where a vehicle is stably traveling. At step S5, the difference between the rotational velocity determinate values (DEL (1), DEL (2) and DEL (3)) of 1 second before and the current determinate values (Delta 1, Delta 2 and Delta 3) is calculated. At step S6, the obtained difference is compared with a predetermined threshold and it is further determined whether or not a vehicle is stably traveling.

At step 7, in the case where it is determined that a vehicle is stably traveling at steps S4 and S6, 1 is added to the counter C1, which represents the stability of traveling. At step S8, a wheel with the slowest rotational velocity is temporarily determined by signs of the rotational velocity determinate values (DEL (1), DEL (2) and DEL (3)). When a wheel with the slowest rotational velocity is determined, 1 is added to the counter C2 for counting the number of determinations at step S9 and the sign of the rotational number determinate value DEL (1) is stored.

At step S10, the counter C1 for counting the number of determination of stable traveling is compared with a preset maximum value C1max, for example 15. At step S11, the counter C2 for counting the number of determinations of a wheel with the slowest rotational wheel velocity is compared with the preset maximum value C2max, for example 10. In the case where each of the counters exceeds the respective preset values at steps S10 and S11, the flag which represents the determination result of the slowest wheel (Slower Wheel Flag) is conclusively set as 1 at step 12. Then, the sign which represents the majority (C2max=10) among the signs of the plurality of stored DEL (1) (maximum C1max=15) is stored.

At step S13, upon terminating the count of the counter C1 for counting the numbers of stable traveling (C1max=15), Slower Confirmation Done Flag is set to 1.

At step S14, the stored value (1 second before) of rotational velocity determinate values (DEL (1), DEL (2) and DEL (3)) is updated to the current values.

At step S15, the value of the determinate flag of a wheel with slowest rotational velocity (Slower Wheel Flag) is examined. In the case where the value is 0, a deflation warning module is activated at step S17.

As for the deflation warning module, a known module can be used. When the value of the determinate flag is 1 at step S15, it is determined whether or not air-pressure of a wheel located at the opposing side of a wheel positioned at the diagonal position of the wheel with the slowest rotational velocity is decreased (step S17) in the case where sign of stored DEL (1) is different from sign of current DEL (1) (step S16).

Another Embodiment of the present invention relates to a method for alarming abnormality in tire air-pressure, including steps of detecting whether or not rotational wheel velocity of one wheel is slower compared with those of the other wheels by comparing rotational wheel velocities of respective tires provided on a vehicle. The method can be implemented in the same manner as the apparatus for alarming abnormality in tire air-pressure according to the present invention.

EXAMPLE

The present invention will now be described in detail on the basis of Examples. However, the present invention is not limited to such Examples.

The conditions of a driving test for confirming the performance of the method for alarming abnormality in tire air-pressure of the present invention is shown in conjunction with the test course.

(Test Vehicle)
Type of test vehicle: Mercedes-Benz E class
Tire size: 245/40ZR18 (Dunlop SP Wi Sp M3 97V)
Internal pressure: N. P. (Normal Pressure)
(Experimental Condition)
Load: offset load (Driver and 290 kg in the booth left)
Experiment location: Sumitomo Rubber Industries, Okayama testing course and neighboring local straight roads Comparative Example 1

Figure 5:
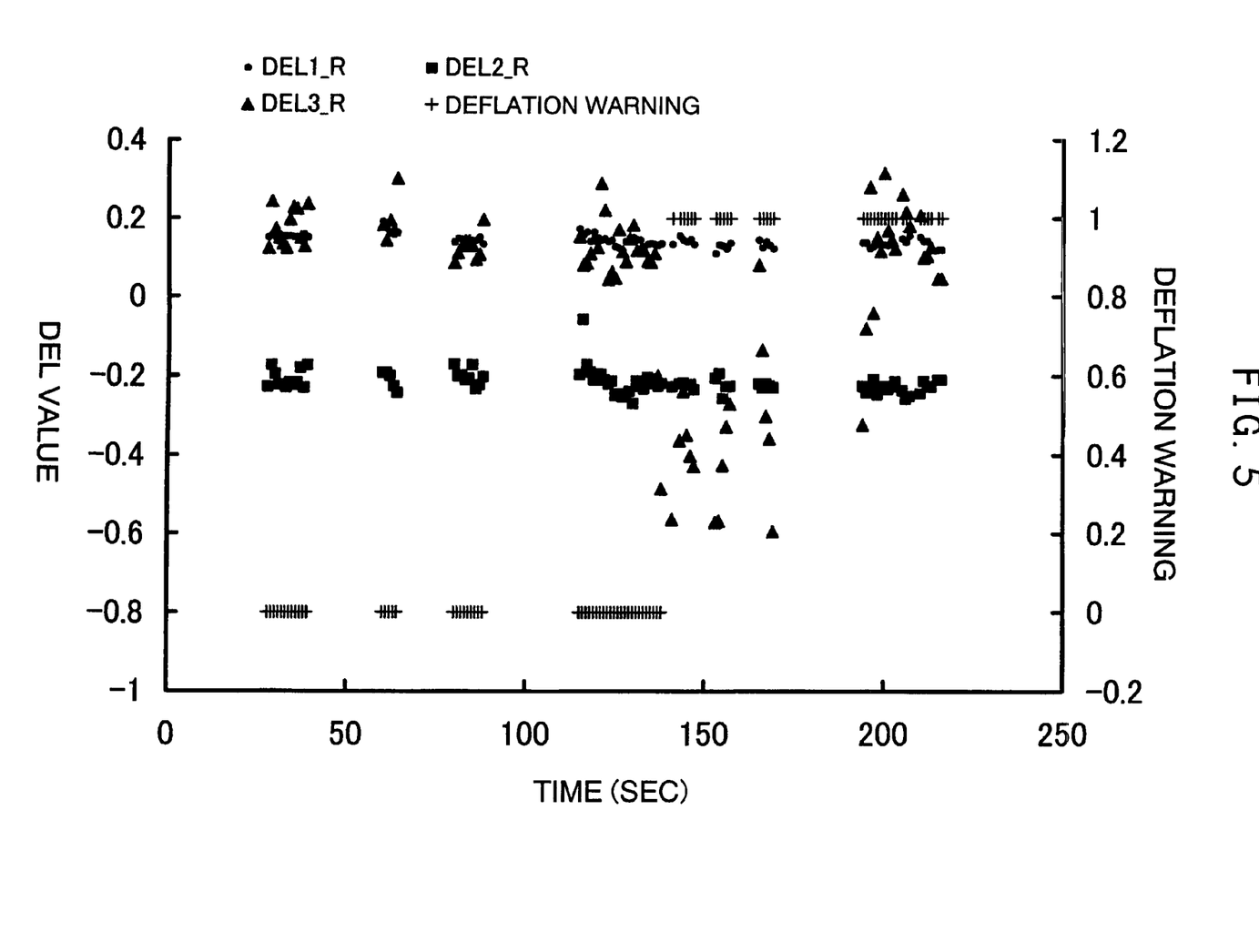
FIG. 5 is a view showing a result of driving test under a conventional method for detecting decreased tire air-pressure.

To detect data, test driving was carried out by installing a tire deflation warning system applying a conventional method of detecting decreased air-pressure which does not include the means for detecting whether or not rotational wheel velocity of one wheel is slower than those of other tires. FIG. 5 shows a condition in which alarms for tire deflation was issued.

In FIG. 5, the vehicle made cornering during the time period of approximately 140 to 220 seconds. Due to the change in the sign of DEL (3) (black triangle) by cornering, deflation warning (+sign) was issued even though the tire air-pressure was normal (erroneous alarm).

Example 1

Figure 6:
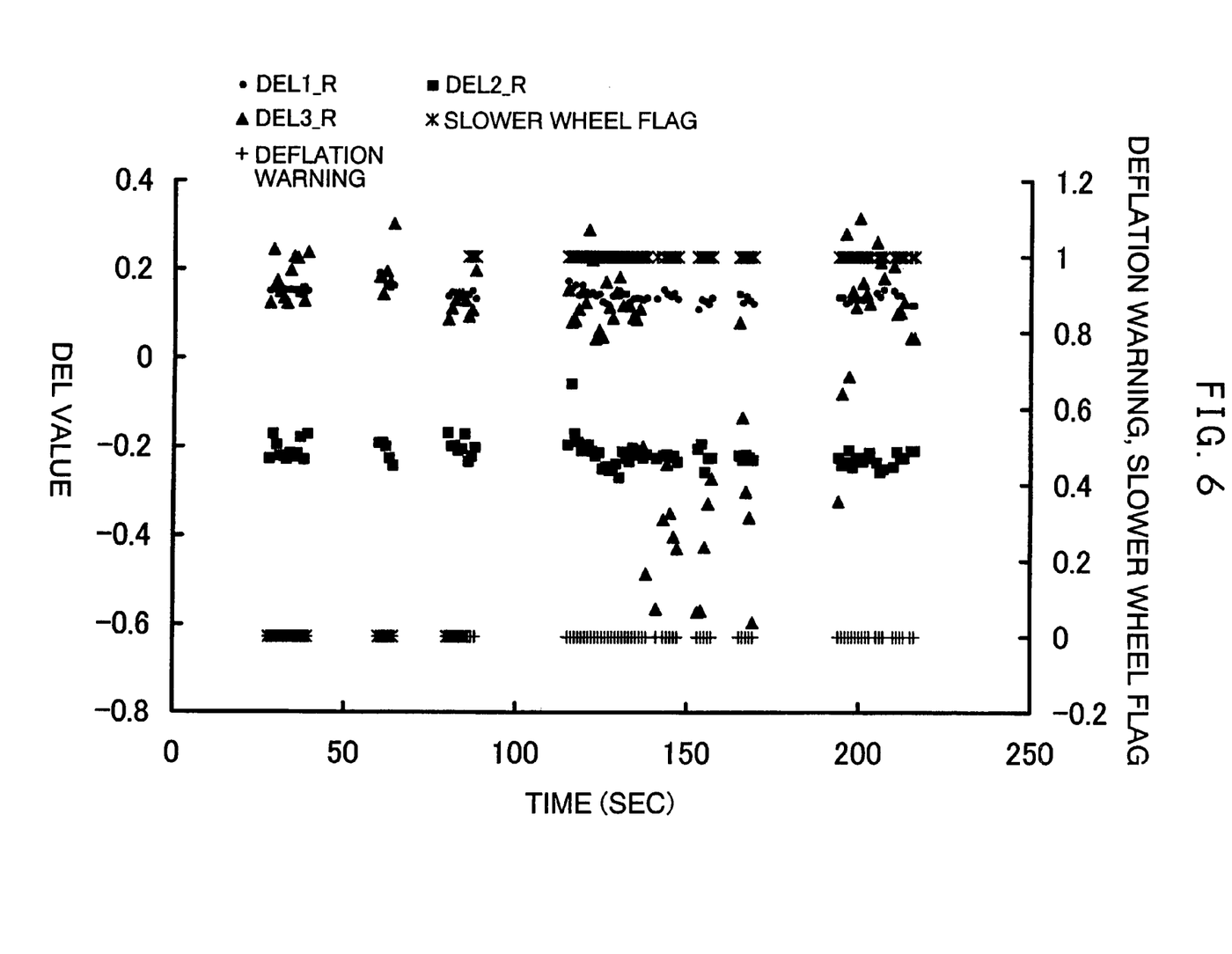
FIG. 6 is a view showing a result of driving test under the method for alarming abnormality in tire air-pressure of the present invention.

To detect data, test driving was carried out by installing an apparatus for alarming abnormality in tire air-pressure applying a method for detecting decreased air-pressure according to the present invention. FIG. 6 shows a condition in which alarms for tire deflation was issued.

In this case, during the time period of 140 to 220 seconds when the vehicle made cornering, slow rotation determination (Slower Wheel Flag: * sign) showing that rotational velocity of one wheel is slower is issued. Thereby, deflation determination was rejected, thus a deflation warning (+sign) was not issued.

As the above-described result, even under the traveling conditions such as cornering in which an erroneous warning may be issued with a conventional method of detecting tire air-pressure, it is appreciated that the issuance of an erroneous alarm is prevented according to the method for alarming abnormality in tire air-pressure of the present invention.

Though several Embodiments of the present invention are described above, it is to be understood that the present invention is not limited only to the above-mentioned, various changes and modifications may be made in the invention without departing from the spirit and scope thereof.

What is claimed is:

1. An apparatus for determining abnormality in tire pressure, comprising:
   means for detecting rotational wheel velocities;
   means for comparing detected rotational wheel velocities of respective tires provided on a vehicle and detecting whether or not rotational wheel velocity of one wheel is slower than those of other wheels; and
   means for judging whether or not there is a decrease in air pressure, said means for judging preventing judgment of the air pressure of the tires or only judging whether or not there is a decrease in air pressure in a tire that is located diagonally from the one wheel having the slower velocity, when the rotational wheel velocity of the one wheel is slower than those of the other wheels.

2. A method for determining abnormality in tire air pressure, comprising steps of:
   using a control unit to perform the following steps:
      detecting rotational wheel velocities;
      comparing rotational wheel velocities of respective tires provided on a vehicle;
      detecting whether or not rotational wheel velocity of one wheel is slower than those of other wheels; and
      preventing judgment of the air pressure of the tires or only judging whether or not there is a decrease in air pressure in a tire that is located diagonally from the one wheel having the slower velocity, when the rotational wheel velocity of the one wheel is slower than those of the other wheels.

3. A program embodied in a computer readable storage medium for determining abnormality in tire air pressure, by making a computer execute the procedure of:
   detecting rotational wheel velocities;
   comparing detected rotational wheel velocities of respective tires provided on a vehicle;
   detecting whether or not rotational wheel velocity of one wheel is slower than those of other wheels, and
   preventing judgment of the air pressure of the tires or only judging whether or not there is a decrease in air pressure in a tire that is located diagonally from the one wheel having the slower velocity, when the rotational wheel velocity of the one wheel is slower than those of the other wheels.

* * * * *